United States Patent [19]

Muramatsu et al.

[11] 4,223,951
[45] Sep. 23, 1980

[54] MOUNTING STRUCTURE FOR A HUB CAP OR A WHEEL CAP

[75] Inventors: Tadao Muramatsu; Katsuhiro Fujiwara, both of Toyota, Japan

[73] Assignee: Toyota Jidosha Kogyo Kabushiki Kaisha, Toyota, Japan

[21] Appl. No.: 895,386

[22] Filed: Apr. 11, 1978

[30] Foreign Application Priority Data

Nov. 1, 1977 [JP] Japan .......................... 52-146603[U]

[51] Int. Cl.² ............................................... B60B 7/06
[52] U.S. Cl. ............................ 301/37 PB; 301/108 R
[58] Field of Search ................ 301/37 R, 37 P, 37 T, 301/37 C, 37 CD, 37 TP, 37 PB, 37 B, 108 R, 108 A

[56] References Cited

U.S. PATENT DOCUMENTS

| | | | |
|---|---|---|---|
| 2,199,888 | 5/1940 | Lyon | 301/37 TP |
| 2,804,348 | 8/1957 | Lyon | 301/37 B |
| 2,809,076 | 10/1957 | Plotkin | 301/37 R |
| 3,043,632 | 7/1962 | Wagner | 301/37 R |
| 3,416,840 | 12/1968 | Gibbings | 301/37 P |
| 4,063,783 | 12/1977 | Spisak | 301/37 P |

Primary Examiner—Charles A. Marmor
Attorney, Agent, or Firm—Stevens, Davis, Miller & Mosher

[57] ABSTRACT

A structure for mounting a hub cap or a wheel cap to a wheel, wherein an annular element having a strap-like body, a number of elastic tongues and a number of first and second detent portions is interposed between the cap and the wheel in such a manner that the annular element is firmly fixed to the cap by the first and second detent portions while the annular element removably engages with the wheel by the elastic tongues.

4 Claims, 4 Drawing Figures

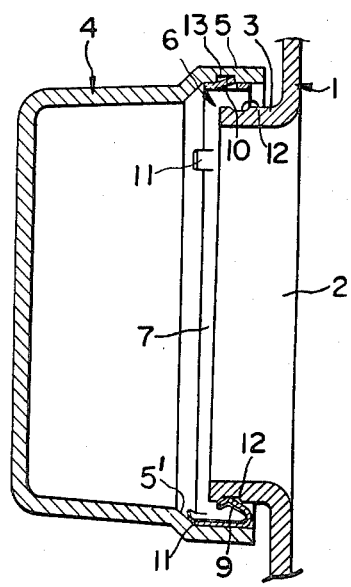
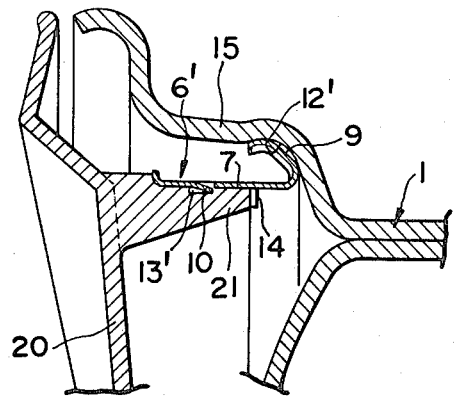
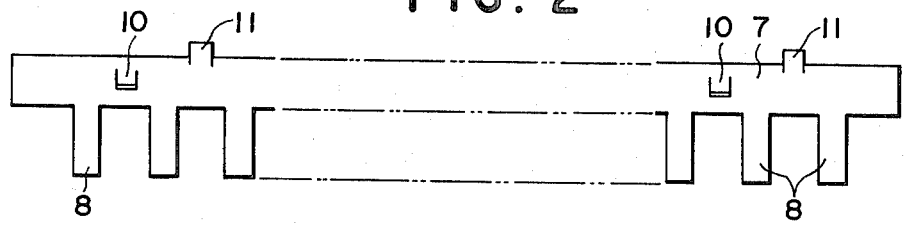
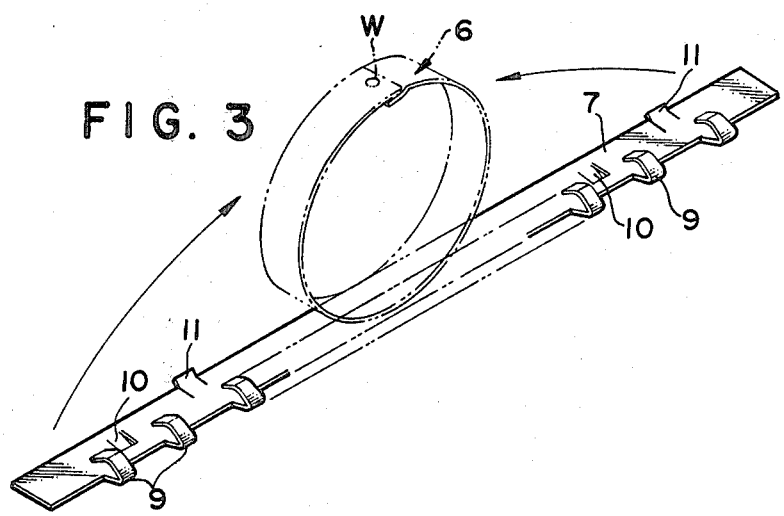

MOUNTING STRUCTURE FOR A HUB CAP OR A WHEEL CAP

BACKGROUND OF THE INVENTION

The present invention relates to a structure for mounting a hub cap or a wheel cap to a wheel of an automobile.

Conventionally, a hub cap is mounted to the hub portion of a wheel generally by screw engagement of threads formed at the inside and outside peripheral portions of the cap and the hub portion of the wheel, or by small mounting screws. On the other hand, a wheel cap is mounted to the rim portion of a wheel by a number of clip elements which are integral with the body of the wheel cap or are individually mounted to the wheel cap or to the wheel. However, these conventional structures for mounting such caps to the wheel are rather expensive and require a great deal of trouble for mounting and dismounting the caps to and from the wheel.

SUMMARY OF THE INVENTION

The object of the present invention is to provide an improved structure for mounting a hub cap or a wheel cap to the wheel of an automobile which is less expensive to manufacture and allows for easy mounting and dismounting.

In accordance with the present invention, the above-mentioned object is accomplished by providing a structure for mounting a hub cap or a wheel cap to a wheel, comprising an annular element having a strap-like body, a number of elastic tongues made of flaps projected transversely from said body and spaced along said body and each formed into a hook shape, and a number of first and second oppositely directed detent portions transversely cut out from said body and spaced along said body, said hub cap or wheel cap having an annular groove for retaining said first detent portions and an annular land portion for engaging with said second detent portions, said wheel including an annular groove for removably receiving said elastic tongues, wherein said hub cap or said wheel cap is mounted to said wheel by way of said annular element interposed therebetween.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 1 is a longitudinal sectional view of the structure for mounting a hub cap to a wheel showing an embodiment of the present invention;

FIG. 2 is an unrolled view of the piece of flat material out of which is made the annular element to be incorporated in the mounting structure of the present invention;

FIG. 3 is a perspective view showing a manufacturing process of the aforementioned annular element; and FIG. 4 is a longitudinal sectional view of the structure for mounting a wheel cap to a wheel, showing another embodiment of the present invention.

DESCRIPTION OF THE PREFERRED EMBODIMENT

Referring first to FIG. 1, 1 designates a wheel having a hub portion 3 defining a hub opening 2. A hub cap 4 is mounted to the hub portion to cover the hub opening. The hub cap 4 has an annular rim portion 5 having an inner diameter larger than the outer diameter of the hub portion 3 so as to leave an annular space therebetween when it is mounted over the hub portion, said annular space receiving an annular element 6 as explained hereinunder.

The annular element 6 is made from an elastic sheet element such as shown in FIG. 2 in unrolled and flattened form, and has a strap-like body 7, a number of elastic tongues 9 made of flaps 8 projected transversely from said body and spaced along it and each folded into a hook shape, and a number of first and second detent portions 10 and 11 directed respectively towards opposite sides of said body which are transversely cut out from said body and spaced along it. The elastic sheet element as shown in FIG. 2 is easily produced from an elastic sheet material by a punching process, and then the flaps 8 of the sheet element are easily folded into the hook-shape elastic tongues 9 as shown in FIG. 3 by a simple pressing process. The straight element as shown in FIG. 3 by the solid lines is easily formed into the annular element 6 as shown by the phantom lines in FIG. 3, where the opposite ends of the straight element are slightly lapped one over the other and are welded together by spot welding such as shown by W.

Turning again to FIG. 1, the hub cap 4 has an annular groove 13 formed in the inner peripheral surface of its rim portion 5 and adapted to retain the first detent portions 10 of the annular element and an annular land portion 5' adapted to engage with the second detent portions 11 of the annular element 6 when the annular element is mounted into the rim portion 5 of the hub cap. On the other hand, the hub portion 3 of the wheel 1 has an annular groove 12 formed in its outer peripheral surface and adapted removably to receive the elastic tongues 9 of the annular element 6 when the annular element is mounted onto the hub portion.

In initial assembly, the annular element as manufactured according to the processes shown in FIGS. 2 and 3 is interposed in correct orientation between the hub portion 3 of the wheel 1 and the annular rim portion 5 of the hub cap 4, and then the hub cap 4 need only be pushed toward the wheel 1. As this is done, the first detent portions 10 which are of the non-return type easily slide over the inner peripheral surface of the annular rim portion 5 including the groove 13 and when the tip ends of the detent portions 10 have engaged into the groove 13 they are retained therein and prevent the annular element 6 from being disengaged from the hub cap 4. At the same time the second detent portions 11 engage with the annular land portion 5', and by the combination of the first and second detent portions 10 and 11 reacting against the body of the hub cap 4 in opposite directions the annular element 6 is firmly maintained in its mounted position in the hub cap. On the other hand, the elastic tongues 9 of the annular element 6 are received in the groove 12 formed in the outer peripheral surface of the hub portion 3 of the wheel 1. However, since the elastic tongues 9 are formed not to be of the non-return type, they are only removably received in the groove 12, although since the tongues 9 are elastic and firmly engage into the groove 12, there is no danger that the hub cap should fall off during the use of the car.

FIG. 4 shows the mounting structure of the present invention embodied for mounting a wheel cap. In this embodiment, the wheel cap 20 is mounted to a rim portion 15 of the wheel 1. Furthermore, although the annular element 6' is also made from a sheet of material similar to that shown in FIG. 2, it is different from the annular element 6 shown in FIG. 1 in that the looping direction of the sheet material is opposite to that of the annular element 6 so that the elastic tongues 9 are located outside the body 7 while the first detent portions 10 are located inside the body 7, and furthermore in that the second detent portions 11 in the annular element 6 are replaced by detent portions 14 located between the elastic tongues 9 and the first detent portions 10 and adapted to engage with the inner end of an annular land portion 21 of the wheel cap 20. The annular land portion 21 has a cylindrical outer surface for receiving the body 7 of the annular element 6 and an annular groove 13' formed in said outer cylindrical surface, which is adapted to retain the detent portions 10 of the annular element 6'. On the other hand, the rim portion 15 of the wheel 1 has an annular groove 12' which is formed as a part of the particular shape of the cross section of the rim portion 15 and is adapted removably to receive the elastic tongues 9 of the annular element 6'. It will be understood that the initial mounting of the wheel cap 20 to the wheel 1 by employing the annular element 6' as well as later mounting or dismounting of the wheel cap to or from the wheel are performed substantially in the same manner as with the structure shown in FIG. 1, and that, as in FIG. 1, the annular element 6' is firmly maintained in its position mounted to the wheel cap 20 after the initial mounting.

The annular elements 6 and 6' must be made from an elastic sheet. On the other hand, the hub cap 4 or the wheel cap 20 may be made of any suitable material such as synthetic resin in order to reduce the weight and cost of the car. In this connection, it will be appreciated that the mounting structure of the present invention ensures firm mounting of a hub cap or a wheel cap at a relatively low cost and regardless of the material of the hub cap or the wheel cap.

Although the invention has been shown and described with respect to some preferred embodiments thereof, it should be understood by those skilled in the art that various changes and omissions of the form and detail thereof may be made therein without departing from the scope of the invention.

We claim:

1. A structure for mounting a hub cap having an annular rim portion which provides a cylindrical bore to a wheel, comprising an annular element having a strap-like body which has a radially outside cylindrical surface having a diameter substantially equal to the diameter of said cylindrical bore of said rim portion, a number of elastic tongues made of flaps projected transversely from said body and spaced along said body and each folded into a hook shape, and a number of first and second oppositely directed detent portions transversely cut out from said body and spaced along said body, said hub cap having an annular groove which retains said first detent portions and an annular land portion which engages with said second detent portions when said annular element is mounted to said hub cap so that the radially outside cylindrical surface of said body engages with the cylindrical bore of said hub cap, said wheel including an annular groove for removably receiving said elastic tongues, wherein said hub cap is mounted to said wheel by way of said annular element interposed therebetween.

2. The structure of claim 1, wherein said wheel has a hub portion having an outer peripheral surface which has said annular groove for removably receiving said elastic tongues of said annular element, said elastic tongues of said annular element being located radially inside of the body of said annular element.

3. The structure of claim 1, wherein said hub cap has a cup-shaped body having a smaller diameter than said annular rim portion, wherein said annular land portion is formed as an intermediate portion between said annular rim portion and said cup-shaped body portion.

4. A structure for mounting to a wheel a wheel cap having an annular land portion which provides a radially outside cylindrical surface, comprising an annular element having a strap-like body which has a radially inside cylindrical surface having a diameter substantially equal to the diameter of said cylindrical surface of said annular land portion, a number of elastic tongues projecting radially outside of the strap-like body and made of flaps projected transversely from said body and spaced along said body and each folded into a hook shape, and a number of first and second oppositely directed detent portions transversely cut out from said body and spaced along it, said wheel cap having an annular groove which retains said first detent portions and a further annular land portion which engages with said second detent portions when said annular element is mounted to said wheel cap so that the radially inside cylindrical surface of said body engages with the radially outside cylindrical surface of said wheel cap, said second detent portions being located between said first detent portions and said elastic tongues and engaging with an axial end of said annular land portion, said wheel including an annular groove for removably receiving said elastic tongues, wherein said wheel cap is mounted to said wheel by way of said annular element interposed therebetween.

* * * * *